(12) United States Patent
Johnson et al.

(10) Patent No.: US 7,337,439 B1
(45) Date of Patent: Feb. 26, 2008

(54) METHOD FOR INCREASING THE SPEED OF SPECULATIVE EXECUTION

(75) Inventors: Richard Johnson, Sunnyvale, CA (US); Guillermo Rozas, Los Gatos, CA (US)

(73) Assignee: Transmeta Corporation, Santa Clara, CA (US)

( * ) Notice: Subject to any disclaimer, the term of this patent is extended or adjusted under 35 U.S.C. 154(b) by 519 days.

(21) Appl. No.: 10/464,871

(22) Filed: Jun. 18, 2003

Related U.S. Application Data

(63) Continuation of application No. 09/421,484, filed on Oct. 20, 1999, now Pat. No. 6,748,589.

(51) Int. Cl.
*G06F 9/45* (2006.01)
(52) U.S. Cl. ........................ 717/161; 717/150
(58) Field of Classification Search ......... 717/149–161
See application file for complete search history.

(56) References Cited

U.S. PATENT DOCUMENTS

| 5,926,832 | A | 7/1999 | Wing et al. |
| 6,247,027 | B1 | 6/2001 | Chaudhry et al. |
| 6,339,832 | B1 | 1/2002 | Bowman-Amuah |
| 6,748,589 | B1 * | 6/2004 | Johnson et al. ............. 717/150 |

OTHER PUBLICATIONS

Freudenberger et al, "Avoidance and Suppression of Compensation Code in a Trace Scheduling Compiler", ACM, pp. 1156-1214, Jul. 1994.*

Schlansker, et al.; "Control CPR: A Branch Height Reduction Optimization Fro Epic Architectures", Proceedings of the SCM Sigplan '99 Conference on Programming Language Design and Implementation; pp. 155-168; May 99.

Fisher et al.; "Trace Scheduling; A Technique for Global Microcode Compaction"; IEEE Transaction on Computers; vol. C-30, No. 7; Jul. 1981.

Hwu et al.; "The Superblock: An Effective Technique for VLIW and Superscalar Compilation"; The Journal of Supercomputing, 7, pp. 229-248; 1993 Kluwer Academic Publishers, Boston, Manufactured in the Netherlands.

Lowney et al.; "The Multiflow Trace Scheduling Compiler"; The Journal of Supercomputing, 7, pp. 51-142; 1993 Kluwer Academic Publishers, Boston, Manufactured in the Netherlands.

Freudenberger et al., "Avoidance and Suppression of Compensation code in a Trace Scheduling Comiler," ACM, pp. 1156-1214, Jul. 1994.

Bodik et al., "Complete Removal of Redundant Expressions", ACM, pp. 1-14, May 1998.

Bernstein et al., "Code Duplication: An Assist for Global Instruction Scheduling", ACM, pp. 103-113, 1991.

Goodenough et al., "Exception Handling: Issues and a Proposed Notation", ACM, pp. 683-693, 1975.

* cited by examiner

*Primary Examiner*—Ted T. Vo

(57) ABSTRACT

A method for increasing the speed of execution by a processor including the steps of selecting a sequence of instructions to optimize, optimizing the sequence of instructions, creating a duplicate of instructions from the sequence of instructions which has been selected to optimize, executing the optimized sequence of instructions, and responding to an error during the execution of the optimized sequence of instructions by rolling back to the duplicate of instructions from the sequence of instructions.

13 Claims, 3 Drawing Sheets

METHOD FOR INCREASING THE SPEED OF SPECULATIVE EXECUTION

This is a continuation of application Ser. No. 09/421,484 filed on Oct. 20, 1999, now U.S. Pat. No. 6,748,589, which is hereby incorporated by reference to this specification which designated the U.S.

BACKGROUND OF THE INVENTION

1. Field of the Invention

This invention relates to computer systems and, more particularly, to methods for increasing the speed of operation of a microprocessor by increasing the aggressiveness of its speculative execution processes.

2. History of the Prior Art

Recently, a new microprocessor was developed which combines a simple but very fast host processor (called a "morph host") and software (referred to as "code morphing software") to execute application programs designed for a processor different than the morph host processor. The morph host processor executes the code morphing software which translates the application programs dynamically into host processor instructions which are able to accomplish the purpose of the original software. As the instructions are translated, they are stored in a translation buffer where they may be accessed and executed without further translation. Although the initial translation of a program is slow, once translated, many of the steps normally required for hardware to execute a program are eliminated. The new microprocessor has proven able to execute translated "target" instructions at a rate equivalent to that attained by the "target" processor for which the programs were designed.

In order to be able to run programs designed for other processors at a rapid rate, the morph host processor includes a number of hardware enhancements. One of these enhancements is a gated store buffer which holds memory stores generated during execution of a sequence of translated host instructions. A second enhancement is a set of host registers (in addition to normal working registers) which hold the state of the target processor at the beginning of any sequence of target instructions being translated. Sequences of target instructions spanning known states of the target processor are translated into host instructions and executed. In one embodiment, if the translated instructions execute without raising an exception, the memory stores held in the gated store buffer are committed to memory; and the registers holding the target state are updated to the target state at the point at which the sequence completed executing. This is referred to as a "commit" operation.

If an exception occurs during the execution of the sequence of host instructions, processing stops; the side effects of the attempted execution may be discarded; and execution may be returned ("rolled back") to the beginning of the sequence of target instructions at which point known state of the target processor exists. This allows very rapid and accurate handling of exceptions, a result which has never been accomplished by the prior art.

Speculation is a term applied to methods for attempting to execute a process even though it is not known with absolute certainty that the process will execute without error. Rather than taking the steps necessary to provide absolute certainty, speculative execution attempts to execute those processes which will very likely execute without error presuming that the total time required for those speculative executions which succeed and for any fix up required by those which do not succeed will be less than the time required to assure that all processes attempted will surely succeed.

It will be noted that the method by which the new microprocessor handles translations by buffering their side effects until execution has been completed enables very rapid execution by speculating that translations will be correct. The availability of this method using the same gated store buffer circuitry and saved register state for rapidly and efficiently handling host level exceptions and faults allows the new microprocessor to speculate on the outcome of other operations.

For example, many processors (including embodiments of the new microprocessor) include a plurality of execution units which are capable of functioning in parallel. In order to make use of multiple functional units and pipelined functional units as well as to mask operation latency, independent operations are reordered and scheduled. Such processors often utilize a scheduler to reorder instructions so that sequences may more efficiently utilize the units. To find a sufficient pool of independent operations, the scheduler must consider operations from multiple basic blocks which means that sequences which include branch operation must be scheduled. Because branch operations are frequent (approximately one in every six), if scheduling is limited to operations between branches, there are not enough independent operations to fully utilize the fine-grain parallelism inherent in pipelined (RISC) or multi-functional unit (superscalar, VLIW) processors.

By utilizing a software scheduler to reorder the naively translated instructions before executing those instruction sequences and by taking advantage of the hardware support for rollback and commit, the new microprocessor is able to accomplish more aggressive reordering than has been attempted by the prior art. When such a reordered sequence of instructions executes to produce a correct result, the reordered sequence may be committed to the translation buffer and target state may be updated. If the reordered sequence generates an exception while executing, then the state of the processor may be rolled back to target state at the beginning of the sequence and a more conservative approach taken in translating the sequence.

Schedulers have always found reordering sequences of instructions which include branch operations to be difficult. For example, if a sequence of instructions includes a branch, and one path is usually taken at the branch, then the sequence of instructions including that path may be reordered to run more rapidly on the presumption that that path will be taken. Such reordering may move an operation from a point following a branch to a point just before the branch in order to utilize a processor execution unit which would otherwise not be utilized during that period. Moving such an instruction may have no effect other than to speed operations if the presumed path is followed. However, moving the instruction may cause problems if the presumed path is not followed. For example, the ordering may cause a change in a register value for use in the presumed path following the branch; if another path is taken, the value may be incorrect on that path. There are many other instances of problems generated by reordering operations around branches.

The prior art has typically taken care of problems of this sort by using less aggressive speculation over shorter sequences of operations, by renaming operations which have been reordered to eliminate value changes, and by providing "compensation" code to repair errors which may be caused by the reordering which has been done. All of these approaches optimize the common path at the expense of less frequently utilized execution paths.

It is desirable to provide a new method of more aggressively reordering and scheduling operations in sequences including branch operations while eliminating errors and accelerating the speed of a microprocessor.

Moreover branch operations are themselves often a bottleneck because they both restrict scheduling and consume instruction issue bandwidth. It is desirable to provide methods for scheduling which eliminate many of the branches normally encountered.

Not only are branches difficult to deal with in optimizing sequences of instructions, similar problems occur because optimized sequences may be interrupted during execution by processes which affect the outcome of execution of the optimized sequence. For example, it may be desirable to optimize a sequence of instructions providing a loop by removing an invariant from the loop. For example, a value stored at a memory address may be loaded each time a loop iterates so that removing the operation and performing it before the loop significantly shorten the overall execution process so long as the value loaded remains constant. However, if the optimized loop is interrupted by an independent process such as a direct memory access (DMA) which writes a new value to the memory address read by the removed operation, then the results produced by the optimized loop will be incorrect. Similarly, a loop may store to a memory address on each iteration. If only the store on the last loop iteration is used by the process, then the store may be removed from the loop and placed in an epilogue to the loop. However, if the optimized loop is interrupted by an independent process which reads the value at the memory address stored to by the removed operation, then the independent operation will read an incorrect value. For this reason, prior art processes have been unable to optimize sequences of instructions by removing an invariant operation from a loop where the underlying memory is volatile.

It is desirable to provide a new method for optimizing sequences of instructions by removing an invariant operation from a loop where the underlying memory is volatile.

SUMMARY OF THE INVENTION

The objects of the present invention are realized by a method for increasing the speed of execution by a processor including the steps of selecting a sequence of instructions to optimize, optimizing the sequence of instructions, creating a duplicate of instructions from the sequence of instructions which has been selected to optimize, executing the optimized sequence of instructions, and responding to an error during the execution of the optimized sequence of instructions by rolling back to the duplicate of instructions from the sequence of instructions.

These and other objects and features of the invention will be better understood by reference to the detailed description which follows taken together with the drawings in which like elements are referred to by like designations throughout the several views.

DETAILED DESCRIPTION

The operations which are presented by an application program to be performed by a computer microprocessor are typically very limited in nature. Examples of typical operations are "load" which takes data from a memory address and places it in a register, "add" which adds the values in two registers, "compare" which compares the value of data in two registers, "branch" which alters the flow of execution, and "store" which takes data from a register and places it in memory. These operations are usually presented to a processor sequentially.

One method of speeding the execution of a program is to provide pipelined or multiple execution units which are able to execute operations in parallel. Superscalar processors are one example of processors having multiple pipelined processing units capable of executing instructions at the same time. Very long instructions word (VLIW) processors are another example. In order to utilize the so-called "instruction-level parallelism (ILP)" of these processors, it is often necessary to reorder and schedule the sequentially presented operations into a series of operations which may be executed at the same time (executed in parallel) by the plural processing units. However, typical sequences of operations often include one or more branch operations. In fact, on an average, branch operations occur as often as every sixth operation in a typical application program. Since branch operations are frequent, scheduling cannot be limited to operations between branches because there are not enough independent operations between branches to fully utilize the fine-grain parallelism inherent in these processors. Thus, it is desirable to enlarge the scope of scheduling to encompass more than short sequences of instructions between branches. However, branch operations make reordering quite difficult.

Figure 1:
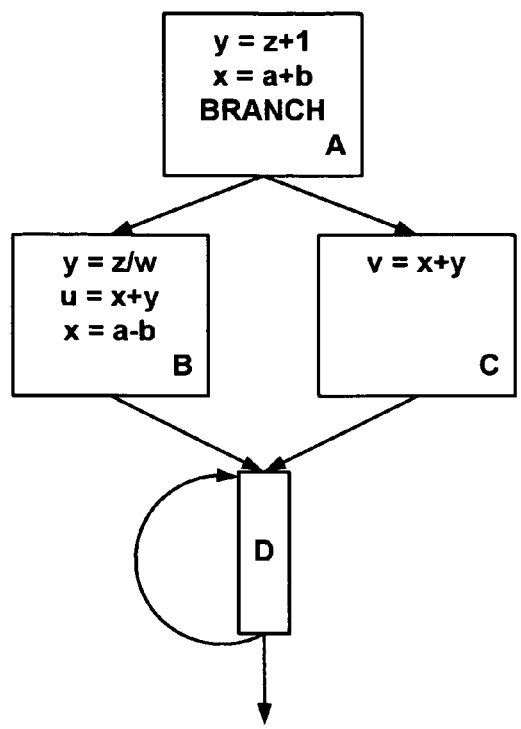
FIG. 1 is a diagram illustrating the flow of control between blocks of operations for a processor.

The diagram of FIG. 1 is a control flow graph of a sequence of operations which are to be executed by a microprocessor with plural processing units. In the figure, a first sequence of operations A are followed by a branch to either of a second sequence of operations B or a third sequence of operations C. Each of sequences of operations B and C are followed by a sequence of operations D. In the example, the sequence of operations D is a loop having at least one and possibly a number of exit points depending on values generated during its execution.

The execution of many sequences of operations including a branch usually follows one particular path (referred to as a preferred trace) more often than another path through the sequence. Because of this proclivity to follow a particular path, it is possible to speculate that the particular execution path will be followed more often than not and to reorder the operations to function optimally if this particular path of execution is followed.

For example, when the processor executing the instructions is capable of executing a number of operations in parallel, it might be desirable to place certain ones of the operations in an order in which they may be executed at the same time. This allows the use of what would otherwise be wasted cycles for an execution unit of the processor and speeds execution.

Figure 2:
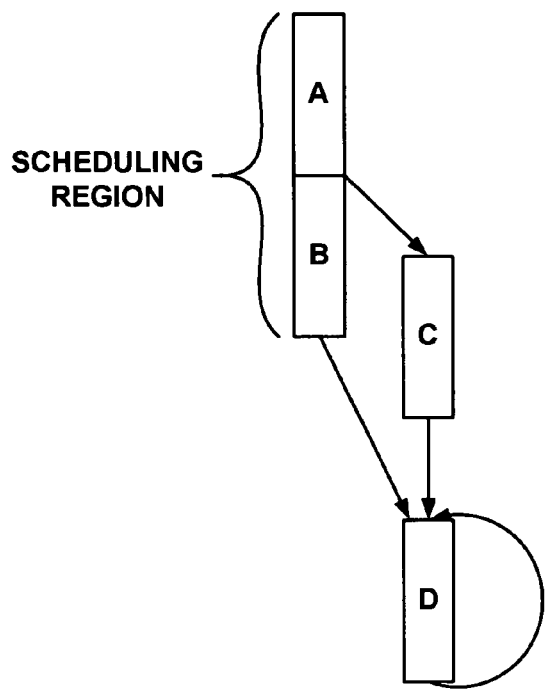
FIG. 2 is a diagram illustrating the sequences of operations of FIG. 1 arranged to illustrate a preferred trace.
Figure 3:
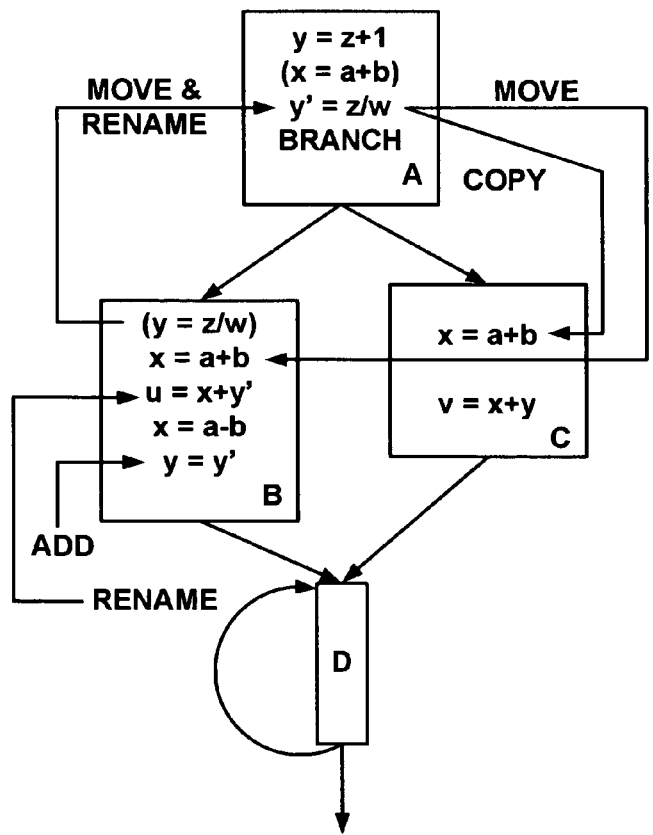
FIG. 3 is a diagram illustrating a manner of optimizing the individual operations of the arrangement of FIG. 2 and problems which can occur in attempting to reschedule the order of operations for a processor.

FIG. 2 illustrates the sequences of operations of FIG. 1 arranged to illustrate a preferred trace. FIG. 3 illustrates the same arrangement but additionally includes a number of operations along the frequently executed path. These operations include in an A sequence; an operation in which y is set equal to z+1, an operation in which x is set equal to a+b, and a branch operation in which either a path to a sequence B in a main trace or a path to a sequence C off the main trace may be taken. The sequence B includes an operation in which y is set equal to z/w, an operation in which u is set equal to x+y, and an operation in which x is overwritten with the value a−b. Should the path to the sequence C be taken, an operation is included in the sequence C in which v is set equal to x+y.

A scheduler attempts to reorder operations by "code movement" so that those operations which can be executed together by the processor will be in position to be executed together. With such a sequence, it may be desirable to move ("code hoist") the operation in which y is set equal to z/w to a position above the branch immediately following the operation in which x is set equal to a+b in order that the two operations be scheduled to execute in the same instruction execution period. Presuming that the operations are executed along the preferred trace, moving the operation in which y is set equal to z/w to be adjacent to the operation in which x is set equal to a+b causes no difficulty. However, if the path to the sequence C is taken, then the value of y used in the operations along the path C is determined by the operation in which y is set equal to z/w. This operation would not have occurred before the branch in the absence of reordering. Thus, the reordering produces an incorrect result.

The failure to produce a correct result when the branch to the sequence C is taken has been corrected by the prior art by renaming the operation which is moved. By renaming y to be y' when the operation is moved to the sequence A, the value of y in the operations of the sequence C is not changed. However, to eliminate the failure requires a renaming operation with the allocation of an addition register and reassigning the original name if the main trace is followed. This requires the use of a significant amount of code to repair the problems caused by the reordering and slows the operation off the main trace. If y is live (may be utilized in an operation) at an exit of the main trace (e.g., at the branch to block D), then we must insert a copy of variable y' into y.

Similarly, it may be desirable to move the operation in which x is set equal to a+b from its position in sequence A above the branch to immediately after the branch in sequence B along the main trace (called "code sinking"). Moving this operation to a sequence in which it is overwritten by the operation in which x is set equal to a−b allows the removal of the moved operation. This reordering causes no problem if the main trace is followed. However, if the branch to the sequence C is taken, the value of x will not have been set to a correct value equal to a−b before the branch so that the sequence C will provide an incorrect result.

In order to provide for the possibility of this occurrence, the prior art has replicated the operation which is moved below the branch along the path of the sequence C so that the operation is carried out before the use of the value in the sequence C. This also requires the use of a significant amount of code to repair the problems caused be the reordering and again slows the operation off the main trace.

Compensation code (e.g., copies due to renaming and replicated code off the main trace) may not be feasible in practice. For example, if there is another control flow path that reaches sequence C, adding code to C may be illegal (consider execution along new path). Alternately, sequence C may be scheduled prior to sequences A and B so that adding code to sequence C is not possible without rescheduling C. Finally, incremental code motion often complicates compiler analysis slowing the compilation process itself.

The present invention obviates much of the need to utilize techniques which slow the execution of operations in order to accomplish rescheduling and reordering. It also allows much more aggressive reordering to be accomplished than has heretofore been possible utilizing prior art techniques.

The present invention makes use of the facilities of the improved microprocessor described above by which the state of a target processor is committed at a point at which state is known to be correct before execution of a translated sequence of operations and a rollback operation is provided to the beginning of the sequence if an error, mis-speculation, exception, or some other asynchronous event occurs during the execution of the sequence of instructions following the commit.

Figure 4:
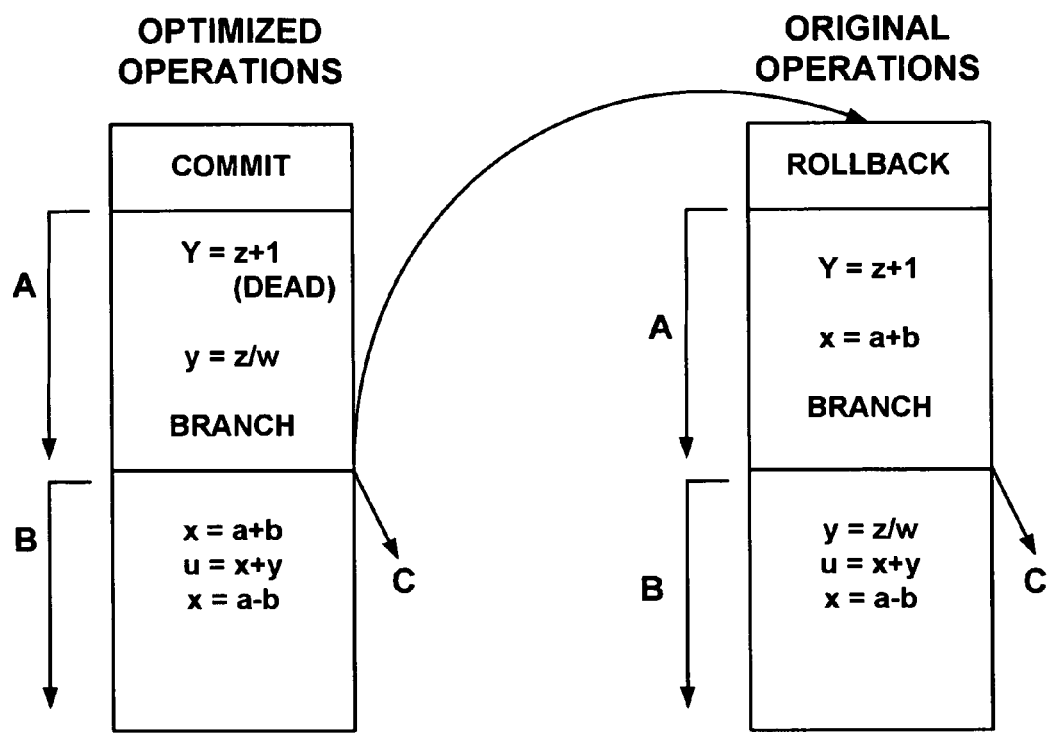
FIG. 4 is a diagram illustrating an improved rescheduling method in accordance with the present invention.

The optimizing operations of the present invention are illustrated in the flow chart of FIG. 4. The optimizing operations provide for first generating a control flow graph for any sequence of operations which is to be reordered and rescheduled. Such a graph selects a preferred trace which will potentially be executed much more often than other possible sequences. Such a trace is generated in a manner known to those skilled in the art. Once such a speculative trace has been generated, a copy of the entire sequence of operations to be optimized is saved. Then, at each branch of the sequence of operations being optimized, the target of the branch off the preferred trace is replaced with a rollback operation placed before the beginning of the original sequence which has been copied and saved. In effect, the branch is retargeted to the rollback operation and the copy of the original unoptimized sequence which follows. Finally, the original sequence of operations is optimized as aggressively as may be desired in the circumstances. In particular, operations on the preferred trace are reordered and optimized as if the side exits are never to be taken. It should be noted that such optimization provides new opportunities for further optimization, such as eliminating the expression "y=z+1" which is no longer needed.

Presuming that the same optimizing of operations is accomplished as is illustrated in FIG. 3 without any renaming or generation of fixup code, when the optimized sequence of operations is executed, it will execute normally so long as the operations continue along the main trace. However, presuming that the branch which would normally lead to path C were to be taken and that the operation setting x equal to a+b had been moved below the branch while the operation setting y equal to z/w had been moved above the branch, all of the results would be incorrect when the branch was executed. However, the branch to path C has been retargeted to a rollback operation followed by the original unoptimized sequence as shown in FIG. 4. When the branch occurs, the results of all of the operations from the beginning of the sequence including those operations causing incorrect results are discarded as a consequence of the rollback operation, execution is sent back to the beginning of the duplicated original sequence for which correct state is recovered, and execution recommences from the beginning of the sequence in the original order of the operations. It should be noted that although the original sequence which follows rollback has been described as unoptimized, that sequence may also be optimized, although in a less aggressive manner which is unlikely to generate any error.

The use of the technique of the present invention is not entirely without cost. In some cases, the static overhead caused by code replication may be larger than that of prior art methods since entire sequences may be duplicated. There is also redundant work which takes place when an off-trace path is taken. Similar code replication and redundant work also exists in other methods but to a lesser degree.

On the other hand, the technique eliminates scheduling constraints normally caused by branches. Branches may be freely reordered thus allowing significant reduction of the critical path on trace. Additionally, off-trace code can be further optimized since side effects are no longer live (subject to execution) off-trace. Moreover, compiler software for a VLIW processor which dynamically compiles translated code is greatly simplified so that compile time overhead is significantly reduced.

Delay caused by the failure of speculative execution is essentially eliminated by the method of the present invention. Moreover, the need to generate and store complicated fixup code to handle the many problems which can arise from reordering is eliminated. No unique compensation code of any sort needs to be generated; a copy of the sequence which is being reordered is merely saved to be run if the speculation on the main trace proves unwarranted.

Figures 5, 6:
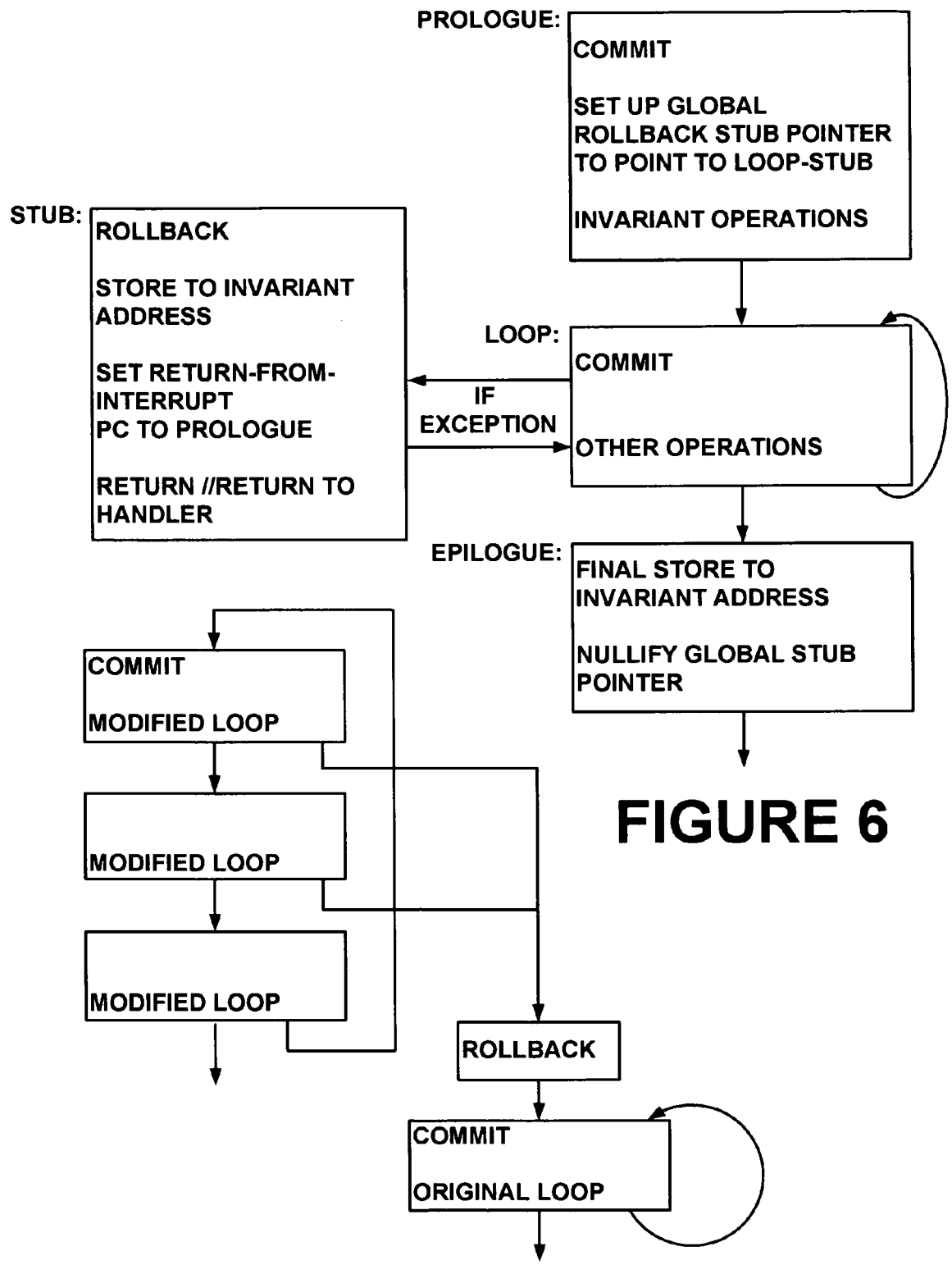
FIG. 5 is diagram illustrating another improved rescheduling method in accordance with the present invention.
FIG. 6 is diagram illustrating yet another example of the rescheduling method in accordance with the present invention.

This method can be extended in accordance with the present invention to other forms of optimization which allow the improved microprocessor to execute processes and programs much faster than processors of the prior art. For example, the method can be extended to loop operations such as the operations represented by sequence D shown in FIG. 1. FIG. 5 illustrates an example in which a loop utilizes the method to significantly accelerate the execution process. If the loop is one such as:

Loop:
   increment x,
   y=f(x), and
   if (x<n) goto Loop;
   //n is some large number, then, on each iteration of the loop a test is conducted after the body function is executed to determine whether x is equal to greater than n. This test constitutes a branch out of the loop to the next sequence of operations.

If the original loop function is copied and saved in accordance with the method, and then the loop is optimized by unrolling, a significant improvement in execution time can be attained. Unrolling means to expand the loop into a larger loop containing a number of the same loop functions. For example, if the loop is unrolled by making two additional copies so that the unrolled loop is:

Loop:
   increment x,
   y=f(x)
   if not (x<n) goto done;
   increment x,
   y=f(x)
   if not (x<n) goto done;
   increment x,
   y=f(x)
   if (x<n) goto Loop
done: . . .

it will be seen that more operations can be considered together in optimizing this longer sequence. For example, if the original loop were to execute one hundred times, then the expanded loop would execute thirty-three times, then exit at the first branch in the thirty-fourth iteration.

It may be seen in the particular example that the operation in which y is set equal to the value of some function of x continuously writes over the value y in a register. Consequently, as long as the test x=>n is not met, the step may be eliminated. Scheduling the loop under the assumption that branches fall through eliminates two operations from each iteration of the expanded loop.

Then the branch operation at each test is set to rollback to the beginning of the saved copy of the original loop.

When the expanded loop is executed, state including the value of n is committed before each entry to the expanded loop. Then, the expanded loop is executed. So long as the test is not met, the loop executes in its entirety, commits state, and begins another loop. With each iteration of the expanded loop, at least two store operations are eliminated. When the test is met, for example when x==n==100 after thirty-three completions of the expanded loop and the first step of the thirty-fourth iteration of the loop, execution branches to rollback to the beginning of the original loop. At this point, the operation beginning iteration thirty-four of the expanded loop is discarded. However since state including x=99 was saved before the thirty-fourth loop began, the original loop will be executed only once before the test is met and the loop ends.

Thus, it will be seen that the method allows the elimination of two operations in each of thirty-three expanded loops or a total of sixty-six operations while requiring only that the first step of the thirty-fourth loop be discarded. This is a very significant saving. Of course, the saving can be much greater with loops which are executed a larger number of times or which provide greater opportunities for optimization in the unrolled modified body of the loop. The example illustrates the basic mechanism using a simple dead code optimization. In general, many optimizations apply when the effects of internal exit branches can be ignored in the unrolled loop.

Another use of the invention allows optimization which generalizes the removal of invariant operations to include removal of loads from invariant addresses that may be in volatile memory and replacement of repeated stores to an invariant address with a single store to the invariant address after the loop terminates. An invariant in a loop is an operation which occurs in the same manner each time the loop is executed. For example, a loop may include an operation in which a register is loaded with a constant value.

For example:

Loop
   load x, [A]
   y=f(x)
   other operations
   if (c) goto Loop

If the invariant operations can be moved to a position prior to the loop so that it occurs before the loop is entered, then each iteration of the loop may be shortened by removing those operations.

Thus:

Loop_prolog:

| | |
|---|---|
| load x, [A] | ; address A is invariant |
| y = f(x) | ; invariant since x is invariant |

Loop:
   other operations
   if (c) goto Loop

Where a loop is executed a large number of times, moving the invariant outside the loop may significantly accelerate execution of the loop.

However, if an operation uses data at a memory address which may be modified indirectly, then moving the operation outside of the loop is not permitted by prior art methods because the operation may not be invariant. Using the same example, if the value loaded to the register is at an invariant memory address, but the address may be written by some other process such as a direct memory access (DMA) operation, then the value loaded may change. Moving the operation outside the loop is illegal because the value loaded may be different if the memory address is written.

The invention may be used to allow operations that reference invariant addresses to be moved outside a loop even when the invariant memory addresses are volatile. To accomplish this, the scheduler moves all invariant operations into a loop prolog, and identifies references to invariant memory addresses that may be volatile. Moving invariant operations to the prolog reduces the amount of work performed in each iteration of the loop and can save a significant amount of processing time. If such volatile invariant addresses are found among the invariant operations, the scheduler creates a "rollback stub" that will guarantee correct execution even when data at one of the invariant addresses is modified by DMA or some other process.

The rollback stub is executed whenever the loop is interrupted by DMA or by another process that can access the volatile memory locations referenced in the loop. Such an interrupt is treated like a branch operation off the preferred trace described in the previous examples of the method. The rollback stub performs a rollback to the processor state saved at the previous commit. Since each loop iteration begins with a commit, the state is rolled back to the beginning of the current loop iteration. Next, the stub contains code that modifies the "return from exception" program counter so that loop execution will resume at the loop prolog, rather than at the beginning of the current iteration. The result is that after servicing the DMA interrupt or executing another process, the processor will re-execute the invariant operations before executing further loop iterations. If any volatile memory has been modified, the values of all dependent loop invariant operations will be updated by re-executing the loop prolog. This eliminates any error which might have been caused by a write to the data address of an invariant operation. FIG. 6 shows the loop prolog, loop body, loop epilogue, and rollback stub.

One mechanism for calling the rollback stub whenever the loop is interrupted is to set up a global pointer to the stub in the loop prologue and nullify this pointer on loop exit. If the loop is interrupted (e.g., by a DMA interrupt), the interrupt handler will call whatever stub is pointed to by the global rollback stub pointer. If the pointer is null, the handler skips the stub call. Setup and nullification of the global stub pointer is shown in FIG. 6.

Using this same mechanism, a store operation with an invariant address can also be moved into a loop epilogue. Repeated stores to the same address overwrite earlier stores to the same address, and only the final stored value is needed at the loop exit. By moving such a store operation into a loop epilogue, the memory traffic of the loop is significantly reduced and scheduling constraints are also removed. However, if the loop is interrupted during execution, such code motion is illegal if the interrupting process can access the invariant address. For example, if the interrupting process is a DMA read, it can get the wrong value if it accesses the invariant address before the store has occurred.

The proposed mechanism solves this problem by performing stores to invariant addresses in the rollback stub. When the loop is interrupted, the rollback stub is called. The stub performs the rollback to the state at the beginning of the current iteration, performs the store to the invariant address, then sets up the return program counter and proceeds to the interrupt handler as in the load case. Note that the value stored in each iteration of the original loop is held in a known register at the end of each iteration of the optimized loop, so that it can be stored to memory from this register in the loop epilogue. Therefore, the value held in this register after a rollback will be the value computed in the previous iteration, and this is the value that would have been stored in the previous iteration of the original loop; by storing this register to the invariant memory location prior to jumping to the interrupt handler, the rollback stub reconstructs the correct memory state.

Additional variations of the same method by which additional processing, speed may be attained will be obvious to those skilled in the art. For example, other operations in which an invariant may be rendered volatile by an external process may utilize variations of the method.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method of code modification and speculative code execution by a processor comprising:
   duplicating a first sequence of instructions to generate a second sequence of instructions;
   modifying said second sequence of instructions to increase execution efficiency thereof;
   executing said modified sequence of instructions; and
   upon exiting said modified sequence of instructions and prior to executing at least one instruction of said first sequence of instructions, loading an updated state of said processor.

2. The method of claim 1, wherein said first sequence of instructions comprises a branch operation, and wherein said modified sequence of instructions is generated assuming that said branch operation will not be executed.

3. The method of claim 1 further comprising:
   saving said updated state of said processor by writing a value to a memory of said processor, wherein said value relates to said first sequence of instructions, and wherein said value is written before execution of said portion of said modified sequence of instructions.

4. The method of claim 3, wherein said loading an updated state of said processor further comprises loading said value.

5. The method of claim 1 further comprising:
   detecting an asynchronous event indicating a need to exit said modified sequence of instructions.

6. The method of claim 5, wherein said asynchronous event comprises at least one of an error, a mls-speculation and an exception.

7. The method of claim 1, wherein said updated state of said processor comprises a correct state for enabling execution of said at least one instruction of said first sequence of instructions.

8. A method of code modification and speculative code execution by a processor comprising:

duplicating a first sequence of instructions to generate a second sequence of instructions, wherein said first sequence of instructions comprises a first loop, and wherein said second sequence of instructions comprises a second loop;

modifying said second sequence of instructions to increase execution efficiency thereof;

executing said modified sequence of instructions; and upon identifying an event indicating a need to exit said modified sequence of instructions, loading an updated state of said processor and executing a portion of said first sequence of instructions.

9. The method of claim 8, wherein said modifying said second sequence of instructions comprises unrolling said second loop.

10. The method of claim 8, wherein said event comprises a satisfaction of a conditional instruction of said modified sequence of instructions.

11. The method of claim 8, wherein said updated state is saved in response to an execution of an instruction of said second loop.

12. The method of claim 8, wherein said modifying comprises removal of at least one invariable operation from said second sequence of instructions, wherein said at least one invariable operation is performed during execution of said portion of said first sequence of instructions after exit from said modified sequence of instructions.

13. The method of claim 12, wherein said at least one invariable operation is operable to access a memory location which remains constant between iterations of said second loop.

* * * * *